United States Patent Office 2,749,313
Patented June 5, 1956

2,749,313

METHOD OF CLEANING POLYMERIZATION REACTORS

Harry Leverne Williams and Melvin John George Davidson, Sarnia, Ontario, Canada, assignors to Polymer Corporation Limited, Sarnia, Ontario, Canada, a corporation of Canada No Drawing. Application June 30, 1952,
Serial No. 296,482

Claims priority, application Canada April 21, 1952

11 Claims. (Cl. 252—104)

This invention relates generally to a method and solvent for degrading and dissolving highly cross-linked or high molecular weight polymers. More particularly it relates to the removal of polymer film from the walls of emulsion polymerization reactors where the molecular structure of the film is such that it resists the solvent action of common solvents.

It is common in the art to carry on the emulsion polymerization of butadiene with or without comonomer such as styrene and acrylonitrile in glass-lined vessels of approximately 3,700-gallon capacity. These vessels are surrounded by a water jacket through which cooling water is circulated for the purpose of dissipating the heat of reaction. The efficiency of temperature control of such reactions is dependent upon the adequate transfer of heat through the wall of the vessel. In the course of repeated charging of a reactor a film of polymer accumulates on the glass lining of the vessel, and the prolonged use of the vessel will result in a film frequently ½ inch in thickness, particularly on the upper portion of the reactor. The effect of such films, and even much thinner films, is to materially reduce the rate of transfer of the heat of reaction through the reactor wall and a decline in the efficiency of temperature control is experienced. It is frequently necessary to reduce the rate of reaction to a level consistent with the efficiency of heat transfer in order to retain adequate control of the reaction.

With the advent of lower temperature polymerization reactions offering superior products, the temperature of the cooling liquid in the reactor jacket was lowered and the problem of temperature control became increasingly important and increasingly difficult. Frequently the inefficiency of the heat transfer has been the cause of many reactions going out of control.

The task of cleaning reactor walls has traditionally been an arduous one, for the polymer film is highly cross-linked and, to a considerable degree, is insoluble in the usual solvents. The glass lining of the reactor prohibits the use of very aggressive mechanical means for film removal. Hard wood scrapers, manually operated, were in general use and have subsequently been replaced by plastic scrapers of similar design which retain their edge for a longer period. The mechanical cleaning process is long and arduous, and complete removal of film is virtually impossible to achieve, particularly where reactor linings have been roughened by corrosion. The inadequacy of common solvents for the removal or softening of such films is known to all skilled in the art but may be illustrated by the following data accumulated in the course of tests using an air lift circulating apparatus or percolator. Small samples of a butadiene-styrene polymer film removed from a reactor lining were placed on the wire gauze of each of several such percolators. Operating at the indicated temperature a slow stream of air was passed through the tube, forcing small portions of the solvent up the tube and allowing it to splash over the sample.

TABLE I

TIME, 24 HOURS

| Common Solvent | Wt. of Sample in Grams | Temp., °C. | Quantity of Sample dissolved | | Remarks |
| --- | --- | --- | --- | --- | --- |
| | | | By Wt. (g.) | Per-cent | |
| Benzene | 2.0 | 20 | 0.31 | 15.5 | Sample very swollen. |
| Do | 2.0 | 55 | 0.275 | 13.8 | Do. |
| Methyl Amyl Ketone | 2.0 | 20 | 0.69 | 34.5 | |
| Methyl Isobutyl Ketone | 2.0 | 20 | 0.29 | 14.5 | |
| Do | 2.0 | 75 | 1.2 | 60 | |
| Chlorobenzene | 2.0 | 20 | 0.28 | 14 | |
| Nitrobenzene | 2.0 | 20 | 0.24 | 12 | |
| Ethyl Butyl Ketone | 2.0 | 20 | 0.27 | 13.5 | |

Other common solvents such as carbon tetra chloride and a light hydrocarbon oil (distillation range 310–390° F., see Example V) were put to a screening test and found equally unsatisfactory alone. Ketones generally, benzene, and the light hydrocarbon oil appeared to be equivalents and the latter had the advantage of being less toxic, less hazardous, and less costly. It will be noted that an increase in temperature has a considerable influence on the effectiveness of methyl isobutyl ketone.

It is an object of this invention to provide a method of solvent for dissolving highly cross-linked polymers of butadiene with or without comonomers. It is a further object of this invention to provide a method of cleaning the walls of reactors on which has accumulated a film which will either remove the film completely or reduce it to the point where it may be readily removed by brushing down or flushing. It is a still further object of the invention to provide a solvent which will attack and partially dissolve butadiene-acrylonitrile polymers of such molecular construction as are not appreciably affected by common solvents.

It has been found that a solution of an organic hydroperoxide in a suitable solvent will efficiently attack the polymer films normally encountered on the walls of reactors employed in the emulsion polymerization of butadiene, butadiene-styrene, and butadiene-acrylonitrile and either dissolve them completely or reduce them sufficiently so that mechanical cleaning is appreciably facilitated. The practice of the invention will be fully understood from a study of the following examples which, while preferred embodiments of the invention, do not purport to exhaust the possibilities nor to limit the scope of this invention.

Example I

Employing the air lift circulating apparatus previously described, except as indicated, and utilizing a variety of solvents containing the indicated proportions of cumene hydroperoxide the comparative efficiency of the various solvents on butadiene-styrene films was determined.

TABLE II

| Solvent | Bd-Styrene Sample | Temp., °C. | Time, hours | Quantity dissolved | | Remarks |
|---|---|---|---|---|---|---|
| | | | | Wt. | Percent | |
| Methyl Amyl Ketone plus 2% Cumene Hydroperoxide. | 2.0 | 20 | 24 | 0.64 | 32.0 | Addition of cumene hydroperoxide without further change does not appear to improve the solvent action of Methyl Amyl Ketone. |
| Benzene plus 2% Cumene Hydroperoxide. | 2.0 | 20 | 24 | 0.47 | 23.5 | No appreciable change at 20° C. |
| Methyl Isobutyl Ketone plus 2% Cumene Hydroperoxide. | 2.0 | 20 | 24 | 0.68 | 34 | |
| Do. | 2.0 | 75 | 24 | 2.3 | 100 | (Solvent too strong, dissolved cork.) |
| Benzene plus 2% Cumene Hydroperoxide. | 2.0 | 80 | 24 | 1.45 | 72.6 | Note effect of temperature increase. |
| Light Oil plus 2% Cumene Hydroperoxide. | 2.0 | 80 | 24 | 1.69 | 84.5 | |
| Light Oil plus 4% Cumene Hydroperoxide.[1] | 5.0 | 80 | 24 | 4.0 | 80 | |

[1] The apparatus in this case involved a closed flask equipped with an agitator to duplicate, as closely as possible, plant reactor cleaning practice as described in Example V.

*Example II*

Employing the same type of apparatus as was employed in Example I, except as indicated, various solvents were tested to determine their comparative efficiency in dissolving the films deposited on the lining of reactors employed in the emulsion polymerization of butadiene-acrylonitrile polymers. The results are recorded in Table III.

*Example III*

Employing benzene and various peroxides as indicated, a sample of butadiene-acrylonitrile film was stirred for 48 hours at 72° C. The comparative efficiency of the various solvents under these conditions is indicated by the

TABLE III

| Solvent | Wt. of Sample, grams | Temp., °C. | Time, hrs. | Quantity of Sample dissolved | | Remarks |
|---|---|---|---|---|---|---|
| | | | | By Wt. (g.) | Percent | |
| 75% benzene, 21% Methyl Isobutyl Ketone, 4% Cumene Hydroperoxide. | 2.0 | 70 | 48 | 0.57 | 28.5 | |
| Methyl Ethyl Ketone plus 4% Cumene Hydroperoxide. | 2.0 | 60 | 31 | 1.125 | 61 | |
| 75% benzene, 21% Methyl Ethyl Ketone, plus 4% Cumene Hydroperoxide [1]. | 5.0 | 70 | 48 | 2.80 | 56 | |
| 75% light oil, 21% Methyl Ethyl Ketone, plus 4% Cumene Hydroperoxide. | 3.0 | 70 | 48 | 0.832 | 27.8 | |
| Methyl Isobutyl Ketone, plus 4% Cumene Hydroperoxide. | 3.0 | 70 | 48 | 2.20 | 73 | cloudy solution. |
| 71% o-dichlorobenzene plus 25% Methyl Isobutyl Ketone, plus 4% Cumene Hydroperoxide. | 3.0 | 70 | 48 | 1.90 | 63.5 | clear solution. |
| 48.5 mol percent formamide, 48.5 mol percent nitromethane plus 3% Cumene hydroperoxide. | 3.0 | 70 | 48 | 4.22 | 140 | screen corroded while 30-40% of polymer remained on screen. |

[1] The apparatus in this case also involved a closed flask and agitator.

The selection of a suitable solvent for the removal of film from plant size reactors involves several factors in addition to the comparative efficiency of the solvents. Benzene, as demonstrated by Example II, offers little advantage over the light hydrocarbon oil. It has the disadvantage of being toxic while the light oil is not, and the further disadvantage of being more costly. The various ketones, while offering some advantage, are much more costly.

While the use of air, organic solvents and cumene hydroperoxide indicates that polymers may be degraded to the point where their solubility is markedly increased, an investigation of various peroxides in the absence of any appreciable quantity of air was carried out.

results set out in the following table:

TABLE IV

| Peroxide | Percent Peroxide in Benzene | Wt. of Film | Quantity Dissolved | |
|---|---|---|---|---|
| | | | Wt. | Percent |
| None | 0 | 3.0 | 0.672 | 22.4 |
| Cumene hydroperoxide | 4 | 3.0 | 1.322 | 44.1 |
| p-methane hydroperoxide | 4 | 3.0 | 1.349 | 44.9 |
| Tertiary butyl hydroperoxide | 4 | 3.0 | 1.480 | 49.5 |
| Benzoyl peroxide | 4 | 2.5 | 0.850 | 34 |
| Hydrogen peroxide | 4 | 2.5 | 0.627 | 25.2 |

Organic hydroperoxides generally may be expected to prove suitable: e. g. diisopropyl benzene hydroperoxide, cyclohexylbenzene hydroperoxide, cumene hydroperoxide, etc.

The two peroxides appear to be less efficient than the others tested, probably due to a difference in rate of decomposition of the peroxide. It should be noted at this point that the rate of decomposition of the hydroperoxide may be increased by the addition of suitable amines known in the art to accelerate the decomposition of hydroperoxides.

*Example IV*

Employing the apparatus and technique previously described samples of butadiene-styrene film were placed in the air-lift circulating apparatus as in Example I and the following data accumulated after operating for 24 or 48 hours as indicated at room temperature—approximately 20° C.

TABLE V

| Solvent | Wt. of Sample, grams | Time, hrs. | Quantity Dissolved | |
|---|---|---|---|---|
| | | | Wt., grams | Percent |
| Methyl amyl Ketone | 2 | 24 | 0.69 | 34.5 |
| Methyl amyl Ketone plus 2+ cumene hydroperoxide | 2 | 24 | 0.64 | 32 |
| Methyl amyl Ketone plus 2+ cumene hydroperoxide plus a small quantity of diethylene triamine | 2 | 48 | 1.37 | 68.6 |

It is to be noted that the quantity dissolved was increased very substantially. While part of the increase is, no doubt, due to increased residence time this factor is not considered to be too significant. It will also be noted that cumene hydroperoxide does not have a beneficial effect at room temperature. An elevated temperature should be used.

*Example V*

Several reactors were emptied and the upper surface of the glass lining was mechanically cleaned in a superficial manner to remove the heavy coating of polymer film of the butadiene-styrene type. A solution of cumene hydroperoxide in a light hydrocarbon oil at 25° C. was pressured into one reactor. The cooling liquid in the reactor jacket was isolated and steam was introduced into the liquid-filled jacket to increase the temperature of the reactor contents to 78° C. The temperature was maintained in the range of 75–78° C. throughout the cleaning. Agitation of the warm solvent was maintained for approximately 32 hours, at which time the mixture was cooled and pressured to another reactor similarly prepared for cleaning. Flushing or brushing down readily removed any minor residue of film which was encountered chiefly where the glass lining had been severely corroded. Cumene hydroperoxide was added to the cooled solvent where necessary to restore concentration to approximately 4%.

The solvent make-up was as follows:

Reactor loading with light hydrocarbon oil _____ 3,700 gals./U. S.
Specific gravity of hydrocarbon oil __ 0.78
Boiling range _____ 155°–200° C.
Hydrocarbon loading by weight ____ 3,700×8.33×0.78 =24,050 lbs.
Cumene hydroperoxide purity as received _____ 70%.
4% cumene hydroperoxide loading __ 24,050 × .04 × 10%0=1,374 lbs.

The following table records data accumulated in the course of cleaning twelve reactors in succession:

TABLE VI

REACTOR CLEANING DATA

| Reactor No. | Light hydrocarbon oil (Varsol) Temp., °F. | Cumene hydroperoxide additions, lbs. | Percent cumene hydroperoxide | Percent dissolved solids in Varsol | Percent suspended solids in Varsol | Hours Varsol in Reactor |
|---|---|---|---|---|---|---|
| 1 | 150 | 960 | 2.58 | | | 34 |
| 2 | 165 | 485 | 4.15 | | | 24 |
| 3 | ² 168 | | 4.00 | 0.15 | | 30 |
| 4 | ² 168 | | 4.00 | | | 32 |
| 5 | ² 168 | | 3.80 | 0.40 | | 31 |
| 6 | 165 | | 3.68 | ³ 0.38 | 0.016 | 32 |
| | | 100 | 3.29 | | | |
| 7 | 160 | | 3.47 | | | 31 |
| | | 200 | | | | |
| 8 | 165 | | 3.82 | | | 40 |
| 9 ¹ | 160 | | 3.37 | 0.44 | 0.020 | 33 |
| 10 | 160 | 200 | | | | 15 |
| 11 ¹ | 150 | | 3.82 | | | 31 |
| 12 | 165 | | 3.52 | 0.77 | 0.057 | ² 36 |

¹ Not physically cleaned prior to treatment.
² Micromax maximum recording.
³ 100 gals. Varsol added.

The reactor cleaning data demonstrates that the dissolved and suspended solids in the solvent after the first eight reactors were treated is 0.46%. Based on the weight of solvent charge this amounts to approximately 100 pounds of rubber, or an average of from 12 to 13 pounds of rubber film per reactor. It is noted that this quantity of rubber remained after rough mechanical cleaning. Removal of the film from reactors greatly improved the heat transfer coefficient values as shown in Tables VII and VIII.

TABLE VII

| Reactor No. | Before or After | "U" Values for Latex | | | | | | Avg. U | Percent U Increase |
|---|---|---|---|---|---|---|---|---|---|
| 5 | B | 40.5 | 40.5 | 39.5 | 37.8 | 38.6 | 43.2 | 40.0 | 18.5 |
| | A | 47.0 | 48.3 | 46.8 | 46.3 | 48.9 | 46.4 | 47.4 | |
| 4 | B | 28.9 | 28.3 | 27.2 | 28.0 | 28.3 | 27.6 | 28.0 | 94.2 |
| | A | 51.6 | 55.2 | 54.1 | 56.4 | 51.2 | 57.1 | 54.4 | |
| 3 | B | 25.3 | 24.7 | 23.6 | 23.4 | 22.4 | 23.5 | 24.3 | 69.1 |
| | A | 40.3 | 41.5 | 40.2 | 41.8 | 40.0 | 43.0 | 41.1 | |
| 2 | B | 20.7 | 20.2 | 22.1 | 23.1 | 20.8 | 20.1 | 21.1 | 76.6 |
| | A | 35.5 | 37.6 | 37.1 | 38.2 | 37.7 | 37.4 | 37.3 | |

TABLE VIII

| Reactor No. | Before or After | "U" Values for Latex | | | | | | Avg. U | Percent U Increase |
|---|---|---|---|---|---|---|---|---|---|
| 1 | B | 25.1 | 24.6 | 25.2 | 24.4 | 24.1 | 24.6 | 24.7 | 84.6 |
| | A | 46.8 | 40.0 | 44.0 | 44.8 | 45.2 | 52.8 | 45.6 | |
| 6 | B | 32.9 | 31.2 | 31.0 | 30.9 | 31.3 | 32.9 | 31.7 | 25.6 |
| | A | 40.0 | 39.7 | 45.7 | 34.3 | 39.1 | 39.9 | 39.8 | |
| 7 | B | 28.6 | 28.2 | 31.3 | 29.7 | 29.1 | 30.7 | 29.6 | 69.5 |
| | A | 52.2 | 47.6 | 51.5 | 50.2 | 49.7 | | 50.2 | |
| 8 | B | 24.6 | 23.4 | 26.2 | 21.9 | 24.5 | 24.5 | 24.2 | 72.3 |
| | A | 40.7 | 40.7 | 43.2 | 42.3 | | | 41.7 | |

NOTE.—The above U values were calculated from six batches of latex before and six batches of latex after cleaning.

While mechanical precleaning is not, in all cases, considered essential, it will be found in many cases to be desirable, for while the cumene hydroperoxide may be replenished in order to maintain the effectiveness of the solvent in that regard, the capacity of the solvent for dissolving polymers can and does become depleted and a fresh batch must then be made up. Mechanical precleaning may therefore result in a substantial increase in the useful life of a batch of solvent. Rough mechanical precleaning also substantially reduces the solvent cleaning time.

It is not intended to limit the scope of this invention to the examples set out herein. The solvent may comprise any light hydrocarbon oil, cyclic hydrocarbon, oxygenated hydrocarbon, chlorinated hydrocarbon or other solvent known to those skilled in the art to be suitable for dissolving rubber of the type comprising the film, containing an organic hydroperoxide, which decomposes, releasing free radicals resulting in a degradation of the polymer molecule.

We claim:

1. A method of removing from process equipment polymers comprising butadiene-1,3 which are so highly cross-linked that the major proportion of said polymer is insoluble in substances which are solvents for said polymer when said polymer is not cross-linked, which comprises agitating in such equipment a composition comprising a large proportion of a solvent for butadiene-1,3 comprising polymers and a small proportion of an organic hydroperoxide, until the major proportion of the polymer is degraded and is dissolved or suspended in the composition.

2. A method as in claim 1 in which the polymer is selected from the group consisting of butadiene-1,3-styrene and butadiene-1,3-acrylonitrile.

3. A method as in claim 1 in which the organic hydroperoxide is selected from the group consisting of cumene hydroperoxide, p-menthane hydroperoxide, tertiary butyl hydroperoxide, diisopropylbenzene hydroperoxide, cyclohexylbenzene hydroperoxide and mixtures thereof.

4. A method as in claim 1 in which the solvent is a ketone solvent.

5. A method as in claim 1 in which the organic hydroperoxide is 2 to 4% by weight of the solvent.

6. A method as in claim 1 in which a small proportion of an amine is included to increase the rate of decomposition of the organic hydroperoxide.

7. A method as in claim 6 in which the amine is diethylene triamine.

8. A method of removing from process equipment butadiene-1,3-styrene polymers which are so highly cross-linked that the major proportion of said polymer is insoluble in benzene which comprises agitating in such equipment at an elevated temperature below the boiling point of the composition, a composition comprising a large proportion of a solvent for non-cross-linked butadiene-1,3-styrene polymers and a small proportion of an organic hydroperoxide until the major proportion of the polymer is degraded and is dissolved or suspended in the composition.

9. A method as in claim 8 in which the organic hydroperoxide is cumene hydroperoxide.

10. A method as in claim 9 in which the cumene hydroperoxide is 2 to 4% by weight of the solvent.

11. A method of removing from process equipment butadiene-1,3-styrene polymers which are so highly cross-linked that the major proportion of said polymer is insoluble in benzene which comprises treating said highly cross-linked polymers at an elevated temperature below the boiling point of the composition with air and a composition comprising a large proportion of a solvent for non-cross-linked butadiene-1,3-styrene polymers and a small proportion of an organic hydroperoxide until the major proportion of the polymer is degraded and is dissolved or suspended in the composition.

References Cited in the file of this patent

UNITED STATES PATENTS

| | | |
|---|---|---|
| 2,469,847 | Rumscheidt | May 10, 1949 |
| 2,558,498 | Rumscheidt | June 26, 1951 |
| 2,558,527 | Rumscheidt | June 26, 1951 |